(12) United States Patent
Klein et al.

(10) Patent No.: US 8,319,172 B2
(45) Date of Patent: Nov. 27, 2012

(54) OPTOELECTRONIC SENSOR WITH ALIGNMENT LIGHT TRANSMITTER

(75) Inventors: Michael Klein, Waldkirch (DE);
Christoph Märkle, Freiburg (DE);
Bernhard Schindler, Simonswald (DE);
Fabian Weisenberger, Emmendingen (DE)

(73) Assignee: Sick AG, Waldkirch (DE)

( * ) Notice: Subject to any disclaimer, the term of this patent is extended or adjusted under 35 U.S.C. 154(b) by 450 days.

(21) Appl. No.: 12/656,627

(22) Filed: Feb. 5, 2010

(65) Prior Publication Data

US 2010/0219326 A1 Sep. 2, 2010

(30) Foreign Application Priority Data

Mar. 2, 2009 (EP) .................................... 09100158

(51) Int. Cl.
*G06M 7/00* (2006.01)
*G08B 13/00* (2006.01)
(52) U.S. Cl. ......................... 250/221; 340/556
(58) Field of Classification Search .................. 250/221; 340/556, 557
See application file for complete search history.

(56) References Cited

U.S. PATENT DOCUMENTS 5,496,996 A 3/1996 Barnes et al.
2001/0030743 A1 10/2001 Araujo
2006/0238492 A1* 10/2006 Fouquet et al. ............... 345/156

FOREIGN PATENT DOCUMENTS

DE 20 2006 016 588 U1 3/2007
DE 10 2006 062 125 A1 7/2008
EP 1 503 226 A2 2/2005

* cited by examiner

*Primary Examiner* — Thanh Luu
(74) *Attorney, Agent, or Firm* — Nath, Goldberg & Meyer; Jerald L. Meyer; Sanjana Mangalagiri (57) ABSTRACT

An optoelectronic sensor (10) is provided having a transmitter (12) for operating light, a light receiver (14) for the generation of an electrical received signal from incident light and an evaluation unit (16) which can detect an object in the beam path from the transmitter (12) for operating light to the light receiver (14) from the received light, wherein a first alignment light transmitter (13*a*) is provided. In this respect, a second alignment transmitter (13*b*) is provided, with the first alignment light transmitter (13*a*) and the second alignment light transmitter (13*b*) being able to be individually activated and the evaluation unit (16) being designed to determine alignment information on the adjustment of the sensor (10) from a received first alignment signal of the light receiver (14) with an activated first alignment light transmitter (13*a*) and from a received second alignment signal of the light receiver (14) with an activated second alignment light transmitter (13*b*).

14 Claims, 4 Drawing Sheets

OPTOELECTRONIC SENSOR WITH ALIGNMENT LIGHT TRANSMITTER

The invention relates to an optoelectronic sensor and to a method for the alignment of the sensor and for the detection of objects in accordance with the preambles of claims 1 and 11 respectively.

Objects are detected in light-based sensors in a number of applications. In this respect, the object can interrupt a designated light path, such as is the case with light barriers or light grids, or vice versa, as in light scanners, light reflected by the object to be detected can be recognized.

An optical sensor is known from EP 1 503 226 A2, for instance, which is designed as a light probe and has a transmitter for the transmission of transmitted light, a receiver for the reception of transmitted light reflected at an object and an evaluation unit in which the electronic signal of the receiver is evaluated and an object detection signal is output on the detection of reflected transmitted light at an object. In order also to be able to detect structured objects with which only some of the transmitted light beams are reflected back the receiver due to the structures, provision is made in accordance with this teaching that the transmitted light beams are expanded by a light scattering film, for example in a linear manner, so that the object to be detected is illuminated over a larger area and a sufficient refection for detection is available if an object is present. If therefore a minimum degree of reflected light is received, the receiver can determine this and an object detection signal is output.

If a preset light path is provided between the transmitter and the receiver, the sensor requires an adjustment on the putting into operation so that the transmitted light is incident on the receiver to a sufficient degree. With a through beam light barrier, the reception unit has to be aligned with respect to the transmission unit for this purpose, whereas with sensors based on reflection, the cooperative reflective target has to be aligned with respect to the combined transmitter/receiver. The same applies in a similar manner to light grids which can be understood as a plurality of light barriers of the corresponding type arranged next to one another.

A plurality of solutions has already been proposed for a sufficiently exact adjustment, on the one hand, and for a simplified handling, on the other hand.

DE 102 12 432 A1 relates to a reflection light barrier having a plurality of transmitters whose transmitted light should overlap to an approximation to a line. The adjustment problem is thus largely bypassed since the receiver will receive a section of the line in the line direction even with only a very rough alignment. in this respect, transmission energy is, however, necessarily lost.

In EP 0 875 873 B1, the position of the light spot incident on a matrix receiver is taught. One is thus largely independent of the alignment of the sensor as long as only any one light reception element of the matrix is hit. This simultaneously serves for the detection of re-reflections since a multiply reflected beam is admittedly possibly incident on the matrix, but at a different position. These advantages are, however, gained by the much more complex and/or expensive matrix receiver with respect to a simple photodiode.

A light grid is known from DE 10 2006 050 189 B4 which has an additional alignment light beam of a larger opening angle. It is not taken into consideration in the actual detection task in operation and facilitates the rough alignment of the light grid. The information on the adjustment is, however, exhausted in the fact that the alignment light beam is recognized at all and no quantitative statement on the quality of the alignment is made possible.

DE 199 07 548 C2 proposes forming the receiver in a spatially resolving manner as a type of target. A direction display then takes place by a comparison of the reception intensity in the outer reception elements with the middle reception element in order further to improve the alignment. As with a reception matrix, this requires a relatively complex and/or expensive receiver.

A method is known from EP 0 891 004 B1, not in connection with adjustment, for the operation of an optoelectronic sensor in which, for the recognition of transparent objects such as glass bottles or the like, the received signal of the receiver is compared with a recognition threshold value and an object detection signal is output in dependence thereon. This recognition threshold value can be changed in dependence on the received signal so that, for example, a gradual contamination of the optical system can be countered up to a certain degree and an object recognition remains possible.

It is therefore the object of the invention to enable an exact adjustment of a generic sensor with a low effort and/or cost.

This object is satisfied by a sensor in accordance with claim 1 and by a method in accordance with claim 11.

In this respect, the invention starts from the basic idea of gaining additional information on the quality of the alignment using further sensors without in so doing requiring a particularly adapted or more complex and/or expensive light receiver.

The solution in accordance with the invention therefore provides an electronic adjustment aid for the central alignment of the light receiver with respect to the transmitter for operating light or a reflective target. This has the advantage that lateral offset is avoided or suppressed and the functional reserve, i.e. the ratio of the actual received intensity with a free beam path to the threshold of a received intensity which is just still detectable is optimized, is thus as large as possible with respect to the value one. This is particularly relevant if high functional reserves are required, for instance for large ranges, variable conditions, for example with fast contamination, or if, as stated below, the sensor should distinguish between a complete and a partial covering by the object to be detected.

The alignment information is preferably quantitative, that is does not only detect binarily that light is received, but contains a quality measure and in some embodiments also information on the direction in which a readjustment must take place to improve the quality measure.

The light receiver preferably has a single common light reception element, in particular a simple photodiode, and a respective received signal can be generated by selective activation of the transmitter for operating light or of one of the alignment transmitters by multiplexing. A single, simple light receiver results in a particularly cost favorable sensor. Since an at least large use of the transmitted light is ensured by the adjustment, even smaller changes of the received light can also be recognized without spatial resolution at the receiver. The simple light reception element can be used multiply by multiplexing due to the individual activation of transmitters to record a plurality of different received signals.

An optical transmission system is preferably associated with the transmitter for operating light and/or an optical reception system is associated with the light receiver to obtain the desired transmitted light profile or a desired range of view for the receiver. Depending on the design of the sensor, the optical transmission system is possibly simultaneously used as an optical reception system, for instance in a reflection light barrier. The alignment light transmitters preferably also use the same optical transmission system as the transmitter for operating light, otherwise different adjustment of the optical systems could result in adjustment errors. If the alignment light transmitter and the transmitter for operating light are fixed in their spacings and optical axes with respect to one another, for instance by arrangement on the same board, the internal adjustment is ensured from the start. The optical systems preferably have a Fresnel lens. The sensor in accordance with the invention can thus be designed with a small construction space since the spacing between the transmitter or the receiver and an associated lens can be reduced by the use of a Fresnel lens.

The solution in accordance with the invention is preferably used to secure a well-defined detection zone between the transmitter and receiver or reflector. The transmitter for operating light is for this purpose preferably designed so that emerging transmitted light has an approximately linear beam profile. In this connection, the term transmitter for operating light also includes the optionally associated optical system; the beam profile therefore arises by the transmitter for operating light itself, by the associated optical system or in their interaction. Such a sensor can particularly advantageously be used, for example, for the detection of pallets of different heights if namely the linear transmitted light profile is aligned perpendicular to the pallet, that is vertically as a rule, and if the transmitted light is interrupted by the pallet base. Either obliquely aligned conventional light barriers were previously used for such a detection of pallets which, however, can result in defective switching connections due to the working principle in the event of damaged pallets, for instance with a lack of cover planks, or planar-aligned light grids were used which can likewise in principle detect objects which interrupt the individual beams of the light grid over a linearly extended region with a certain resolution. The sensor in accordance with the invention in contrast has a number of advantages, however, in that it admittedly provides the increased security of a light grid, but is, in contrast, of a much simpler design and has an increased switching frequency since a plurality of light beams does not have to be generated and evaluated. Furthermore, the sensor in accordance with the invention has a continuous detection plane, not only a discrete partial monitoring given by the individual beams. Only one beam has to be adjusted, not all individual beams of a light grid. The sensor in accordance with the invention thus provides an inexpensive replacement for a light grid which can be used in a simplified manner in some applications. It is particularly preferred if the emerging transmitted light has an approximately parallel transmitted light beam extent. The adjustment is then independent of the distance and the signal on the receiver is also independent of the position of the object to be detected in the beam path.

A front screen is preferably associated with the transmitter for operating light and/or the light receiver, with at least one of the elements of optical transmission system, optical reception system or front screen sectionally having patterns which absorb light for the homogenization of the transmitted light. The patterns are again preferably printed and thus particularly inexpensive and simple, also subsequently attached. The transmitted light intensity usually drops toward the margin. This marginal drop or another inhomogeneity is compensated by means of the patterns. This is particularly advantageous with a linear beam profile and a sensor which can recognize a partial covering. With a homogeneous beam profile, the intensity loss does not depend on the object position within the beam profile with a partial covering. The front screen is usually part of a housing which protects the transmitter and the light receiver as well as the evaluation unit. To prevent optical crosstalk within the sensor housing from the transmitter to the receiver, an optical dividing wall is provided in a further development of the invention between the transmitter and optionally the optical transmission system and the receiver and optionally the optical reception system.

A first alignment light transmitter and a second alignment light transmitter are preferably arranged with respect to one another and to the transmitter for operating light such that, on reflection at a plane of symmetry through the receiver for operating light, the transmitted light cone of the first alignment light transmitter is incident on that of the second alignment light transmitter and vice versa. This symmetrical arrangement results in a simple distance independent evaluation possibility for the gaining of the alignment information. An easily conceivable arrangement in accordance with this embodiment is a uniform linear arrangement of the first alignment light transmitter, the transmitter for operating light and the second alignment light transmitter, in this order and with respectively the same angle between the optical axes of the alignment light transmitters and the center axis of the transmitted light zone of the transmitter for operating light.

The evaluation unit is preferably designed to determine the alignment information by the prescription $((I_2-I_1)/(I_1+I_2))$ from the relationship of the difference $(I_2-I_1)$ of the intensities $(I_1,I_2)$ of the received signals with an activated first alignment light transmitter and with an activated second alignment transmitter to the sum $(I_1+I_2)$ of these intensities $(I_1,I_2)$. With a symmetrical arrangement of the transmitters and an ideal adjustment, the difference of the intensities $I_2-I_1$ should disappear. Dependencies on environmental conditions, for example, the range, environmental brightness, contamination of the optical system and the like are compensated by reference to the total intensity $I_1+I_2$.

In an advantageous further development of the invention, at least two further alignment transmitters are arranged such that alignment information in the transverse direction to the connection line between the first alignment light transmitter and the second alignment light transmitter can be derived with its aid. An adjustment in two dimensions is thus made possible. What was said for the first and second alignment light transmitters applies to the two additional alignment light transmitters with respect to design and arrangement. All the alignment light transmitters together preferably form a cross shape.

The sensor is preferably designed as a light barrier, in particular a reflection light barrier, in that, with a free beam path, light of the transmitter for operating light is received by the light receiver directly or via a reflector, with the evaluation unit being formed to output a detection signal or a switch signal on the detection of an opaque object in the beam path. This sensor construction especially profits from the alignment improved in accordance with the invention.

The evaluation unit preferably has means for the determination and tracking of a recognition threshold value (S) and can detect an object with reference to a falling below of the recognition threshold value with an activated transmitter for operating light, with the recognition threshold value corresponding to a fixable percentage of the received signal with a free beam path. With such an embodiment, a particularly reliable detection of objects is also possible outside clean room conditions if said objects only interrupt a smaller part of the transmitted light so that only slightly less light is received at the receiver than with a free beam path. With the tracking of the recognition threshold value, which further improves the sensitivity which is anyway already high due to the ensuring of a good adjustment, a light barrier is provided which can reliably recognize even very small changes in the received light. The sensor in accordance with the invention can thus also replace light grids or light curtains such as is described above by way of example for a pallet sensor.

The method in accordance with the invention can be designed in a similar manner by further features and shows similar advantages. Exemplary further features are also described in the subordinate claims dependent on the independent claims.

In a particularly preferred further development of the method in accordance with the invention, the transmitted light of the transmitter for operating light has an approximately linear beam profile with an approximately parallel transmitted light extent, with the optical axes of the first alignment light transmitter and of the second alignment light transmitter being reflected into one another by the center axis of the parallel transmitted light beam extent. This symmetrical arrangement is simple to evaluate and independent of distance.

The following steps are preferably carried out in a teach-in phase of the method in accordance with the invention:
  recording the received signals with a respectively individually activated transmitter for operating light, first alignment light transmitter and second alignment transmitter;
  evaluating the received signal of the transmitter for operating light with respect to a required minimum intensity to ensure a sufficient functional reserve;
  evaluation of the received signals of the alignment light transmitters in accordance with the prescription $(I_2-I_1)/(I_1+I_2)$ with respect to a threshold; and
  outputting correction information for the adjustment of the sensor or display of a sufficient adjustment.

In this teach-in phase, the correction information is used to readjust the sensor until a sufficient adjustment is reached. As long as the position of the operating light is still within a desired tolerance window on the light receiver, the sensor cannot be operated reliably and blocks the sensor function. The teach-in phase can, for example, be triggered manually by activation of a switch.

In the teach-in phase, a detection threshold value is preferably additionally fixed as an adjustable percentage of the received signal with a solely activated transmitters for operating light and a free beam path, with an object being detected in operation with reference to a falling below of the recognition threshold value. The recognition threshold value is thus also easily adapted to the conditions of use and the environmental conditions.

The or some of the steps of the teach-in phase are preferably repeated to ensure or track the functional reserve, the adjustment and/or the recognition threshold value in operation. These repetitions can take place cyclically, for example, on the switching on or on request. A restoration of adjustment and functional reserve takes place by a service request, optionally while switching off the sensor function; the sensor tracks the recognition threshold independently at specific time intervals in that the received signal is measured with a free beam path and a fixed percentage thereof is always defined as a new detection threshold value. In this manner, long-term effects such as gradual contamination of the optical system or ageing processes can be effectively eliminated. A reliable detection of objects is always made possible overall by the named method steps even if said objects only interrupt a smaller part of the transmitted light.

The invention will also be explained in the following with respect to further advantages and features with reference to the enclosed drawing and to embodiments. The Figures of the drawing show in.

Figure 1:
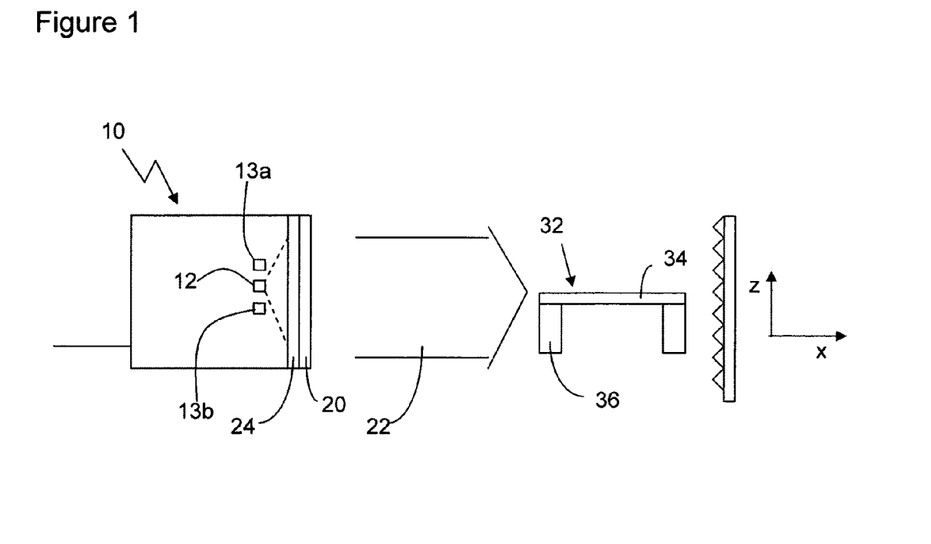
FIG. 1 a side view of an embodiment of the sensor in accordance with the invention and its monitored zone.
Figure 2:
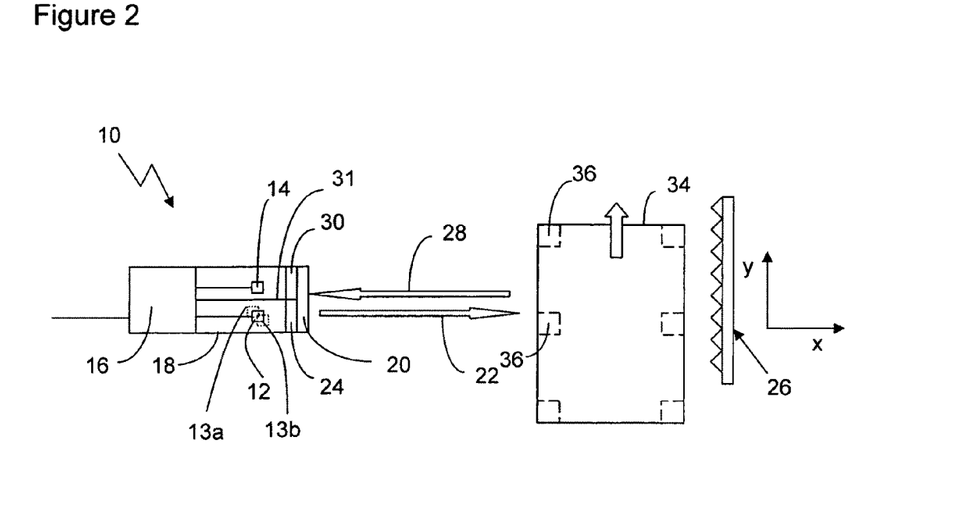
FIG. 2 a plan view of the sensor in accordance with FIG. 1.

FIGS. 1 and 2 show an embodiment of a sensor 10 in accordance with the invention, which is formed as a reflection light barrier, in a side view and a plan view respectively. The sensor 10 has a transmitter 12 for operating light, two alignment light transmitters 13a, 13b, a receiver 14 formed as a photodiode, for example, and an evaluation unit 16. The transmitter 12 for operating light and the alignment light transmitters 13a, 13b cover one another in the plan view of FIG. 2, as is indicated in the drawing by a slightly offset arrangement and dashed lines. The arrangement can be recognized better in FIG. 5 in connection with which the function of the alignment light transmitters 13a, 13b will also be explained further below.

Figure 3:
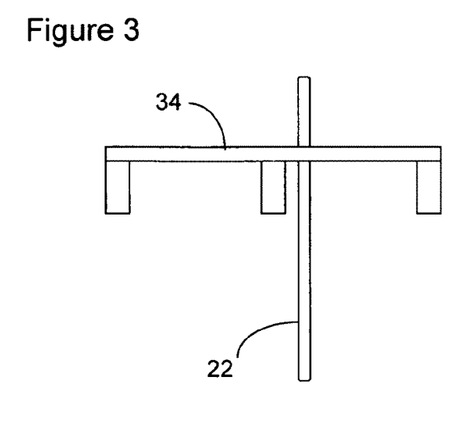
FIGS. 3 and 4 exemplary linear beam profiles of an embodiment of the sensor in accordance with the invention.
Figure 4:
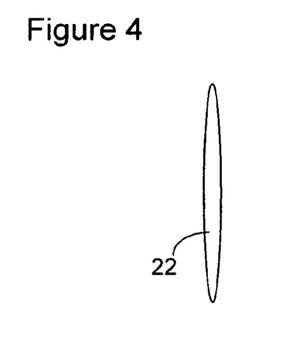

The transmitter 12 for operating light, the alignment light transmitters 13a, 13b, the receiver 14 and the evaluation unit 16 are arranged in a common sensor housing 18 which is covered by a front screen 20 at the front side. The transmitted light 22 transmitted by the sensor 10 is expanded approximately in linear form by an optical transmission system 24 which is associated with the transmitter 12 for operating light so that the transmitted light 22 exiting the sensor 10 has an approximately linear transmission profile such as is shown in FIGS. 3 and 4. In this connection, the transmitted light 22 has an approximately parallel transmitted light beam extent such as can be recognized schematically from the representation in FIG. 1. In accordance with the embodiment in accordance with FIG. 3, the transmitted light 22 is almost rectangular in cross-section, with it being a very narrow rectangle to obtain the linear shape. The transmitted light profile in the embodiment in accordance with FIG. 4 is formed in linear fashion by an elongated elliptical shape. The transmitted light profile is determined by the optical transmission system 24 which can be designed as a Fresnel lens, for example, whereby the spacing between the transmitter 12 for operating light and the optical transmission system 24 can be kept to a minimum to reduce the construction space.

The linear shape of the transmitted light 22 can likewise be recognized in FIGS. 1 and 2, with the transmitted light 22 being very narrow in the perspective of FIG. 1 and being very wide in the perspective of FIG. 2 so that the transmitted light is therefore formed in linear shape in the z direction and is aligned vertically perpendicular to the transport direction y. Although a linear transmitted light profile is preferred, the invention also includes embodiments with other transmitted light profiles.

With a free beam path, the transmitted light 22 is incident on a retroreflector 26 and is reflected back into itself to the sensor 10 by it and is received there as received light 28 by the receiver 14 which has an optical reception system 30 arranged in front of it. The optical reception system 30 focuses the likewise linear received light 28 onto the receiver 14 formed as a photodiode.

So that no optical crosstalk can take place from the transmitter to the receiver within the housing, an optical dividing wall 31 is preferably provided which separates the transmission channel and the reception channel in the sensor housing 18. If the sensor is alternatively formed as a through beam light barrier, the channel separation already takes place by this and the transmission unit and reception unit are accommodated in one housing each.

The received light is converted in the receiver 14 into an electronic received signal which is recorded by the evaluation unit 16. The received signal is thereupon evaluated in the evaluation unit 16 as to whether an opaque object is present in the transmitted light 22 or not and a detection signal is output as required.

Figure 5:
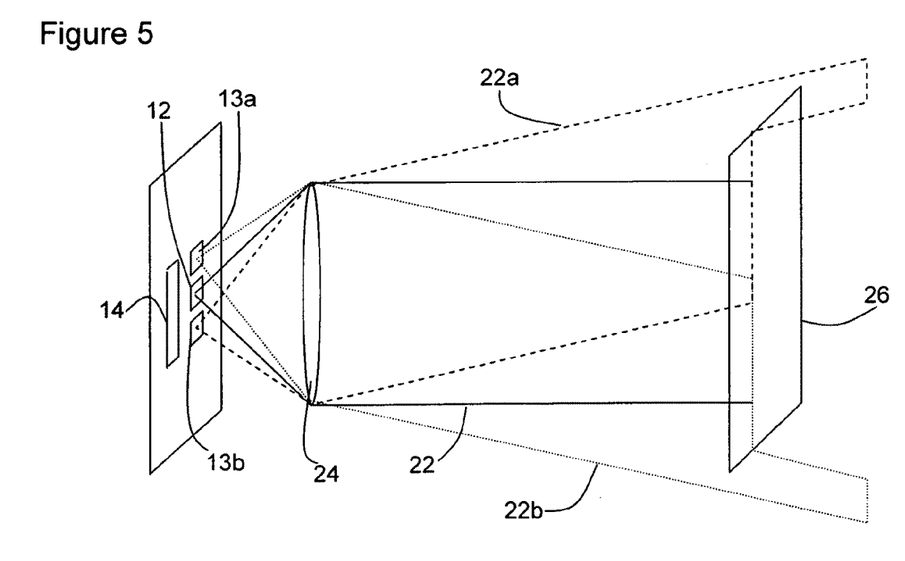
FIG. 5 an explanatory view on the arrangement of light transmitters in the sensor and its beam extents for the determination of alignment information.
Figure 6:
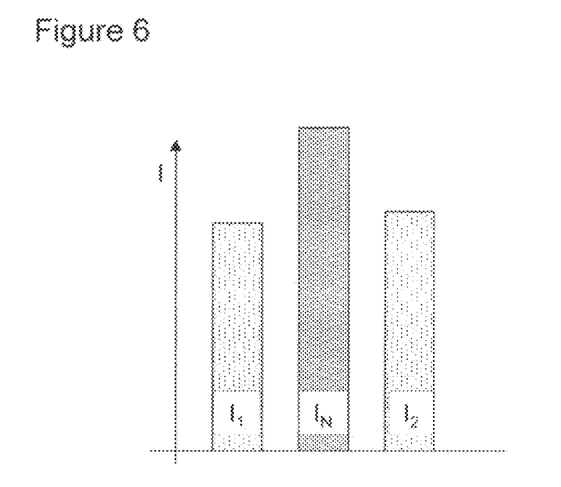
FIG. 6 exemplary intensity values as a basis for the determination of alignment information.

In accordance with the invention, an optoelectronic adjustment aid is provided which will now be explained with reference to FIGS. 5 and 6. In this respect, the two alignment light transmitters 13a, 13b are arranged offset symmetrically beside the transmitter 12 for operating light. The regions swept over by transmitted light on the activation of the transmitters 12, 13a, 13b can be recognized in superimposed form in FIG. 5, with the dashed line 22a belonging to the first alignment light transmitter 13a, the dotted line 22b belonging to the second alignment light transmitter 13b and the solid line 22 belonging to the transmitter 12 for operating light.

For the adjustment, the transmitters 12, 13a, 13b are selectively individually activated with a free beam path in a multiplex process by means of the evaluation unit 16. The reception intensities recorded in this respect at the common light receiver 14 are shown by way of example in FIG. 6, with $I_1$ being the intensity with the activated first alignment light transmitter 13a, $I_2$ being the intensity at the activated second alignment light transmitter 13b and $I_N$ being the intensity with the activated transmitter 12 for operating light. The alignment light transmitters must peer past the reflector since otherwise no location information can be derived so that $I_N$ has the highest amount with a correct adjustment. $I_N$ is not required for the alignment itself, but rather provides information on the functional reserve, that is whether the received intensity with a free beam path is still far enough above the activation threshold.

$I_1$ and $I_2$ should have the same amount between one another. This condition can be checked robustly via a threshold evaluation $(I_2-I_1)/(I_1+I_2)<\epsilon$. As long as the condition is not satisfied, the sign of the intensity difference $I_2-I_1$ provides information on the direction and the amount of the degree of a required adjustment correction. The sensor 10 can display this information in different manners, for example via activation of specific LEDs, via color codes or flashing codes or via figurative or text representations on an LCD. The sensor is only ready to use when the position of the transmitted light 22 of the operating transmitter 12 is within a tolerance window.

The alignment of the transmitters 12, 13a, 13b with respect one another is already given by the manufacture; the adjustment therefore relates to the alignment with respect to the reflector 26 or, with a through beam light barrier between the transmission and reception unit. An alignment perpendicular to the linear direction of the transmitted light 22, that is in the direction perpendicular to the paper plane of FIG. 5, can take place by manual direction finding since it is not critical due to the size of the reflector 26. Alternatively, further alignment light transmitters, not shown, can be provided to the right and to the left next to the transmitter 14 for operating light in order also to support this alignment in an analog manner.

In the embodiment in accordance with FIGS. 1 and 2, the sensor 10 in accordance with the invention serves for the detection of pallets 32. A pallet 32 has a pallet base 34 and pallet feet 36. The optoelectronic sensor 10 is now aligned such that the transmitted light line extends perpendicular to the pallet base 34 so that the pallet base 34 is transported through the transmitted light 22 on the transport of the pallet 32 in the y direction (see also FIG. 3).

Figure 7:
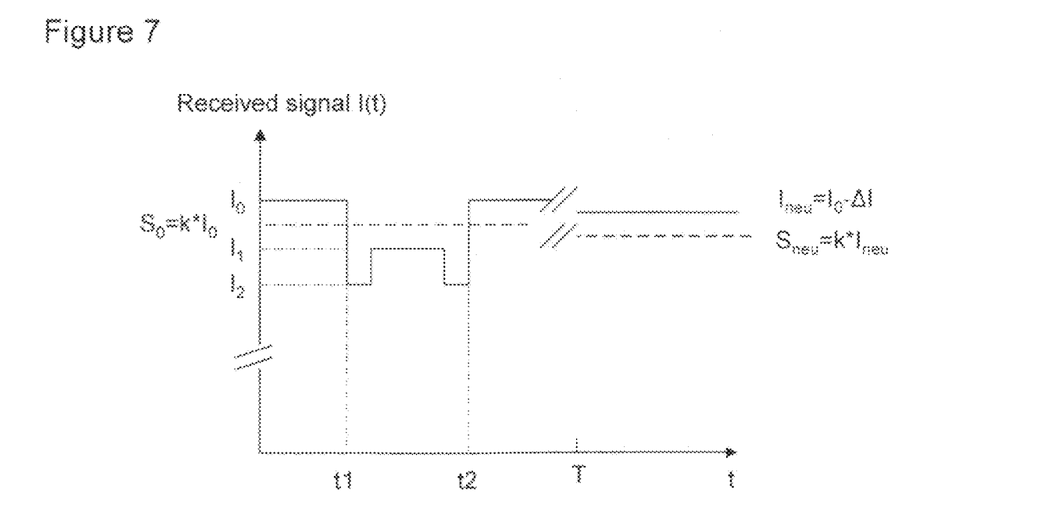
FIG. 7 a schematic diagram of the time extent of the received signal for the explanation of a tracked recognition threshold value in an embodiment of the invention.

Since the pallet base 34 has a relatively small extent in comparison to the extent of the transmitted light 22 in the z direction, it only interrupts the transmitted light section-wise so that a large part of the transmitted light always reaches the reflector 26 and is reflected back into the receiver 14. It is therefore a particular object of the sensor in accordance with the invention to recognize a relatively small intensity change and to output a detection signal as reliably and as securely as possible when at least a pallet base 34 of a pallet 32 is located in the beam path. For this purpose, the sensor 10 works as explained in the following with respect to FIG. 7 in a special embodiment:

At the start, with a free beam path, the received intensity is first determined at the receiver 14 and the corresponding electronic received signal $I_0$ is stored. Then, a recognition threshold value $S_0$ is fixed in the evaluation unit 16 which corresponds to a fixed percentage of the received signal with a free beam path.

$$S_0 = k*I_0 \text{ where } k<1$$

This recognition threshold value $S_0$ must, however, be higher than a received signal $I_1$ which corresponds to the received intensity when at least the pallet base 34 is located in the beam path of the transmitted light 22, for example in the time between t1 and t2. It is then ensured that a pallet is present if the recognition threshold value $S_0$ is fallen below. This naturally also applies when a pallet foot 36 should also enter into the beam path since the signal $I_2$ then received is still smaller than the received signal $I_1$ when only the pallet base 34 is in the transmitted light 22.

After the end of a specific time T, this may be a plurality of seconds, for example, or even minutes or hours, the received signal $I_{new}$ is automatically determined again with a free beam path, that is without pallets, and the previous value for $I_0$ stored in the evaluation unit 16 is overwritten. Starting from this new received signal $I_{new}$ with a free beam path, a new recognition threshold value $S_{new}$ is calculated with the same percentage and is stored as a new recognition threshold value $S_{new}$.

$$S_{new} = k*I_{new}$$

Work is continued with this new recognition threshold value $S_{new}$ until, after a renewed time lapse, a new recognition threshold value is again determined in the same manner. The recognition threshold value is tracked over and over again in this manner. If the time interval T is very short, for example seconds, the tracking is even quasi-continuous.

As already explained above, a respective transmitted light profile is shown schematically in cross-section in FIGS. 3 and 4. So that the recognition of a pallet base 34 located in the beam path 22 is independent of the location of the occurrence of the pallet base 34, the received signal 11 should be independent of the x and z positions.

Figure 8:
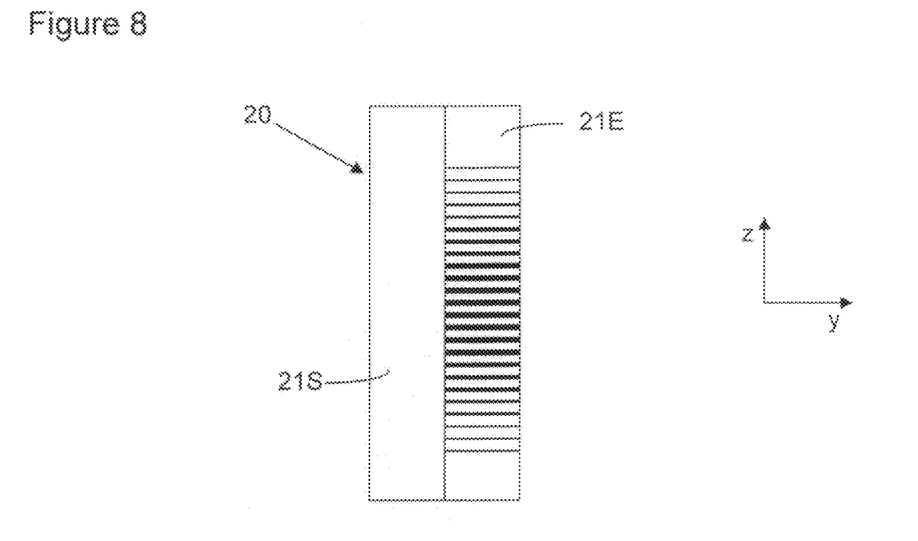
FIG. 8 a schematic representation of an embodiment of a front screen for beam homogenization.

To ensure the independence in the z direction, that is along the transmitted light line, the transmitted light should be homogeneous, which makes high demands on the optical transmission system. They can, however, be reduced if the homogenization can be effected in a different manner. For this purpose, provision is made in a further development of the invention that the front screen is printed in the manner of a pattern in the region 21S through which the transmitted light 22 passes through the front screen 20 or in the region 21E through which the received light 28 passes through the front screen 20 so that ultimately the light transmitted by the sensor and received again is attenuated to different degrees in different regions of the front screen so that ultimately a homogenization of the transmitted light takes place in the z direction from the viewpoint of the receiver 14. The patterns for the printing of the front screen can be formed in different manners. A stripe pattern is shown by way of example in FIG. 8 which attenuates the transmitted light more centrally in the z direction than upwardly or downwardly toward the margins. A printing of only the receiver-side region 21E is advantageous since then the transmitted light emerges at full luminous intensity and reflections of the transmitted light at an object, e.g. the pallet base 34, can be more easily recognized with the naked eye for adjustment purposes.

The independence in the x direction is ensured in that the transmitted light 22 transmitted by the sensor 10 is aligned parallel through the optical transmission system 24. The sensor 10 can detect an object when it is located in the detection region specified by the transmitted light beam path 22 and extended in the z direction, with the opaque object having to cause a certain minimum coverage of the transmitted light so that the received signal for the detection falls below a preset threshold.

The invention claimed is:

1. An optoelectronic sensor (10) having a transmitter (12) for operating light, a light receiver (14) for the generation of an electrical received signal from incident light and an evaluation unit (16) which can detect an object in the beam path from the transmitter (12) for operating light to the light receiver (14) from the received signal, wherein a first alignment light transmitter (13a) is provided, characterized by
    a second alignment light transmitter (13b), with the first alignment light transmitter (13a) and the second alignment light transmitter (13b) being able to be individually activated and the evaluation unit (16) being designed to determine alignment information on the adjustment of the sensor (10) from a received first alignment signal of the light receiver (14) with an activated first alignment light transmitter (13a) and from a received second alignment signal of the light receiver (14) with an activated second alignment light transmitter (13b)
        wherein the light receiver (14) has a single common light reception element; and wherein a respective received signal can be generated by multiplexing by selective activation of the transmitter (12) for operating light or of one of the alignment light transmitters (13a, 13b).

2. A sensor (10) in accordance with claim 1, wherein the single common light reception element, comprises a simple photodiode.

3. A sensor (10) in accordance with claim 1, wherein an optical transmission system (24) is associated with the transmitter (12) for operating light and/or an optical reception system (30) having a Fresnel lens is associated with the light receiver (14).

4. A sensor (10) in accordance with claim 1, wherein a front screen (20) is associated with the transmitter (12) for operating light and/or with the light receiver (14); and wherein at least one of the elements of optical transmission system (24), optical reception system (30) or front screen (20) has patterns absorbing transmitted light (22) section-wise for the homogenization of transmitted light.

5. A sensor (10) in accordance with claim 1, wherein the first alignment light transmitter (13a) and the second alignment light transmitter (13b) are arranged with respect to one another and to the transmitter (12) for operating light such that the transmitted light cone of the first alignment light transmitter (13a) is incident on that of the second alignment light transmitter (13b), and vice versa, on a reflection at a symmetry plane by the receiver (12) for operating light.

6. A sensor (10) in accordance with claim 1, wherein the evaluation unit (16) is designed to determine the alignment information by the prescription $((I_2-I_1)/(I_1+I_2))$ from the relationship of the difference $(I_2-I_1)$ of the intensities $(I_1, I_2)$ of the received signals with an activated first alignment light transmitter (13a) and with an activated second alignment transmitter (13b) to the sum $(1_2+I_2)$ of these intensities $(I_1, I_2)$.

7. A sensor (10) in accordance with claim 1, wherein at least two further alignment light transmitters are arranged such that alignment information in the transverse direction to the connection line between a first alignment light transmitter (13a) and a second alignment light transmitter (13b) can be derived with its aid.

8. A sensor (10) in accordance with claim 1, which is designed as a light barrier, in particular as a reflection light barrier, in that, with a free beam path, light of the transmitter (12) for operating light is received directly or via a reflector (26) by the light receiver (14); and the evaluation unit (16) is designed to output a detection signal or a switch signal on detection of an opaque object in the beam path.

9. A sensor (10) in accordance with claim 1, wherein the evaluation unit (16) has means for the determination and tracking of a recognition threshold value (S) and can detect an object with reference to a falling below of the recognition threshold value with an activated transmitter (12) for operating light, wherein the recognition threshold value corresponds to a fixable percentage of the received signal with a free beam path.

10. An optoelectronic sensor (10) having a transmitter (12) for operating light, a light receiver (14) for the generation of an electrical received signal from incident light and an evaluation unit (16) which can detect an object in the beam path from the transmitter (12) for operating light to the light receiver (14) from the received signal, wherein a first alignment light transmitter (13a) is provided, characterized by
    a second alignment light transmitter (13b), with the first alignment light transmitter (13a) and the second alignment light transmitter (13b) being able to be individually activated and the evaluation unit (16) being designed to determine alignment information on the adjustment of the sensor (10) from a received first alignment signal of the light receiver (14) with an activated first alignment light transmitter (13a) and from a received second alignment signal of the light receiver (14) with an activated second alignment light transmitter (13b)
        wherein the transmitter (12) for operating light is designed such that emerging transmitted light (22) has an approximately linear beam profile and/or an approximately parallel transmitted light beam extent arises.

11. A method for the alignment of an optoelectronic sensor (10) which has a transmitter (12) for operating light, a light receiver (14) which generates an electrical received signal from incident light and a first alignment light transmitter (13a), wherein the sensor (10) detects objects in the beam path from the transmitter (12) for operating light to the light receiver (14),
    characterized in that
    the first alignment light transmitter (13a) and a second alignment light transmitter (13b) are activated individually after one another and the alignment reception signals of the light receiver (14) respectively generated in this process are offset to form alignment information on the adjustment of the sensor (10)

wherein the following steps are carried out in a teach-in phase:

receiving the received signals with a respectively individually activated transmitter (12) for operating light, first alignment light transmitter (13a) and second alignment transmitter (13b);

evaluating the received signal of the transmitter (12) for operating light with respect to a required minimum intensity to ensure a sufficient functional reserve;

evaluating of the received signals of the alignment light transmitters (13a, 13b) in accordance with the prescription $(I_2-I_1)/(I_1+I_2)$ with respect to a threshold ($\epsilon$); and outputting correction information for the adjustment of the sensor (10) or display of a sufficient adjustment.

12. A method in accordance with claim 11, wherein the transmitted light (22) of the transmitter (12) for operating light has an approximately linear beam profile with an approximately parallel transmitted light beam extent; and wherein the optical axes from the first alignment light transmitter (13a) and from the second alignment light transmitter (13b) are reflected into one another by the center axis of the parallel transmitted light beam extent.

13. A method in accordance with claim 11, wherein a recognition threshold value is additionally fixed as an adjustable percentage of the received signal with a solely activated transmitter (12) for operating light and with a free beam path, with an object being detected in operation with reference to a falling below of the recognition threshold value.

14. A method in accordance with claim 11, wherein the steps of the teach-in phase are repeated to ensure or track the adjustment and/or the recognition threshold in operation.

* * * * *